Figure 1:
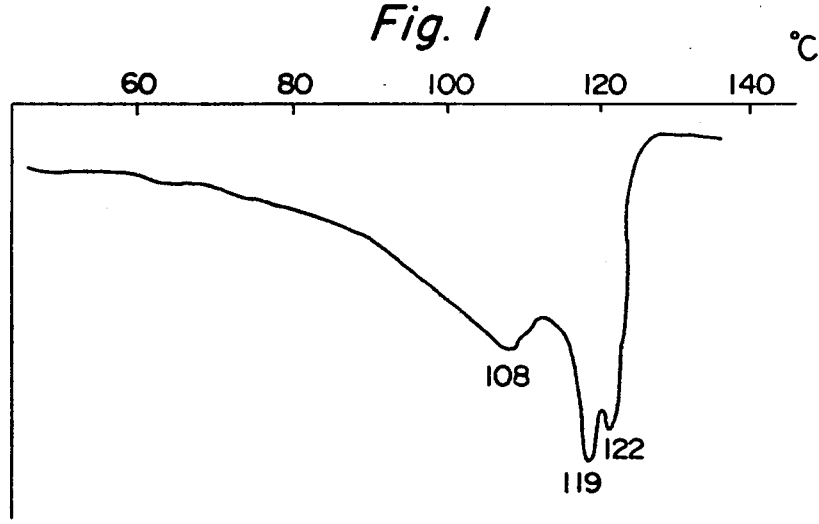

United States Patent [19]

Morita et al.

[11] 4,205,021

[45] May 27, 1980

[54] ETHYLENE COPOLYMERS

[75] Inventors: Yoshinori Morita; Hiroshi Inoue, both of Iwakuni; Kenji Fujiyoshi, Ohtake, all of Japan

[73] Assignee: Mitsui Petrochemical Industries Ltd., Tokyo, Japan

[21] Appl. No.: 870,365

[22] Filed: Jan. 18, 1978

[30] Foreign Application Priority Data

Jan. 27, 1977 [JP] Japan .................................. 52-7315

[51] Int. Cl.$^2$ ...................... C08F 210/14; C08L 23/20
[52] U.S. Cl. .................................... 525/240; 526/125; 526/348.2; 526/348.3; 526/348.4; 526/348.5; 526/348.6
[58] Field of Search ............... 526/348.2, 348.3, 348.4, 526/348.5, 348.6, 125; 260/897 A

[56] References Cited

U.S. PATENT DOCUMENTS

| | | | |
|---|---|---|---|
| 3,409,574 | 11/1968 | Gros | 260/897 A |
| 3,856,719 | 12/1974 | Miyamoto et al. | 260/897 A |
| 3,998,914 | 12/1976 | Lillis et al. | 260/897 A |
| 4,076,698 | 2/1978 | Anderson et al. | 526/348.6 |
| 4,121,030 | 10/1978 | Candlin et al. | 526/135 |

OTHER PUBLICATIONS

Derwent Abstract of West German, 2,609,527-72576X/39.
Derwent Abstract of West German, 2,609,528-72577X/39.

Primary Examiner—Stanford M. Levin
Attorney, Agent, or Firm—Sherman & Shalloway

[57] ABSTRACT

A copolymer consisting essentially of ethylene and an α-olefin with 5 to 18 carbon atoms, said copolymer having
(i) a density of 0.90 to 0.94 g/cm$^3$,
(ii) an intrinsic viscosity $[\eta]$ of 0.8 to 4.0 dl/g,
(iii) a maximum melting point, determined by differential thermal analysis, of 115° to 130° C., and
(iv) a $g_\eta^* (=[\eta]/[\eta]_l)$ value of 0.05 to 0.78, in which formula $[\eta]$ is the intrinsic viscosity of the copolymer and $[\eta]_l$ is the intrinsic viscosity of a linear polyethylene having the same weight average molecular weight determined by the light scattering method as said copolymer.

12 Claims, 3 Drawing Figures

ETHYLENE COPOLYMERS

This invention relates to ethylene copolymers having unique structural characteristics not described in the literature and superior moldability, and to their melt-shaped articles such as films or sheets having superior transparency, improved tear resistance and improved impact resistance. The ethylene copolymers of this invention have superior improved properties eliminating the unsatisfactory levels of the various properties, such as tear resistance, impact strength and transparency, of high-pressure polyethylene and the unsatisfactory levels of such properties and heat resistance of conventional ethylene copolymers, and exhibit unique structural characteristics not described in the literature.

High-pressure polyethylene has been considered to have relatively good transparency, and is used in the production of melt-shaped articles such as films, sheets and hollow containers. Since, however, the high-pressure polyethylene films have unsatisfactory tear strength or impact strength, and are difficult to use as thin films, they have only limited applications. Furthermore, films having superior transparency are difficult to obtain by the inflation molding of high-pressure polyethylene. It has been desired therefore to develop olefinic resins having improved transparency.

Generally, copolymers of ethylene with α-olefins having at least 3 carbon atoms which are produced by using a Ziegler type catalyst have much the same density as high-pressure polyethylene, and exhibit relatively good mechanical strength. When produced by using a vanadium-containing Ziegler-type catalyst, such copolymers have relatively low melting points, and have unsatisfactory thermal resistance. In the presence of a titanium-containing Ziegler-type catalyst, copolymers of ethylene with α-olefins having at least 3 carbon atoms are obtained which have poor transparency.

In the production of such copolymers catalyzed by the titanium-containing Ziegler catalysts, copolymers having much the same transparency as high-pressure polyethylene could be produced by properly modifying the polymerization conditions or the catalysts (disclosed, for example, in Canadian Pat. No. 986,250 assigned to Mitsui Petrochemical Industries, Ltd., issued on Mar. 23, 1976; corresponding to British Pat. No. 1,355,245 published on Oct. 2, 1974). It has been impossible in practice, however, to provide ethylene copolymers having superior tear resistance and impact resistance which eliminate the unsatisfactory levels of these properties in high-pressure polyethylene films, and exhibit better transparency. The above-cited Canadian Patent does not specifically disclose copolymers of ethylene with α-olefins having 5 to 18 carbon atoms.

We have worked extensively in an attempt to develop ethylene copolymers having the aforesaid improved properties, and consequently found that there exist ethylene copolymers consisting essentially of ethylene and α-olefins with 5 to 18 carbon atoms which have unique structural characteristics not described in the literature and which exhibit the aforesaid improved properties.

It is an object of this invention therefore to provide an ethylene copolymer having unique structural characteristics not described in the literature and the aforesaid improved properties.

The above and other objects and advantages of the invention will become more apparent from the following description.

The ethylene copolymers of this invention consisting essentially of ethylene and α-olefins with 5 to 18 carbon atoms have the structural characteristic that as compared with ethylene copolymers described in the literature and being available on the market, they have an exceedingly high weight average molecular weight, $<M>_w$, (determined by the light scattering method) even when they have the same intrinsic viscosities $[\eta]$ as the conventional ethylene copolymers. In the present invention, this characteristic is defined as follows:

$$g_\eta^* = [\eta]/[\eta]l \text{ is } 0.05\text{–}0.78, \text{ preferably } 0.05\text{–}0.5. \quad \text{(iv)}$$

$[\eta]$ is the intrinsic viscosity of the copolymer of this invention; and $[\eta]l$ is the intrinsic viscosity of a linear polyethylene having the same weight average molecular weight (determined by the light scattering method) as the copolymer of this invention.

$[\eta]$ is determined in decalin at 135° C.

The intrinsic viscosity $[\eta]l$ of a linear polyethylene having the same weight average molecular weight $<M>_w$ (determined by the light scattering method) as that of the copolymer of this invention having the intrinsic viscosity $[\eta]$ is calculated in accordance with the following equation.

$$[\eta]l = 5.29 \times 10^{-4} \times <M>_w^{0.713}$$

The $g_\eta^*$ values much smaller than 1 show the structural characteristic that many long-chain branchings exist in the copolymer in addition to short-chain branchings derived from the $C_5$–$C_{18}$ α-olefin copolymerized with ethylene (for example, isobutyl branchings when the α-olefin is 4-methyl-1-pentene). That the ethylene copolymers of this invention have a $g_\eta^*$ value of 0.05 to 0.78, preferably 0.05 to 0.5 shows that the ethylene copolymers of this invention are very different in structure from conventional ethylene copolymers having substantially only short-chain branchings and a $g_\eta^*$ value of 0.80 to 1.0. The transparency of the conventional ethylene copolymers having a $g_\eta^*$ value of 0.80 to 1.0 is at best equivalent to that of the high-pressure polyethylene, and frequently inferior to the latter.

In addition to the aforesaid structural characteristic (iv), the ethylene copolymers of this invention have the following structural characteristics (i) to (iii).

(i) They have a density of 0.90 to 0.94 g/cm³, preferably 0.91 to 0.935 g/cm³.

(ii) They have an intrinsic viscosity $[\eta]$ of 0.8 to 4.0 dl/g, preferably 1.0 to 3.0 dl/g.

(iii) They have a maximum melting point, determined by differential thermal analysis (DSC), of 115° to 130° C., and in many cases 115° to 125° C.

The maximum melting point, as referred to in (iii) above, denotes the highest melting point among two or more melting points (peaks) which usually exist in the DSC endothermic curve of the ethylene copolymer of this invention.

In order for the copolymer of this invention to have good transparency, it should have a density of not more than 0.94 g/cm³, preferably not more than 0.935 g/cm³. On the other hand, to secure superior mechanical characteristics, and freedom from stickiness, the copolymer of this invention should have a density of at least 0.90 g/cm³, and preferably at least 0.91 g/cm³.

The instrinsic viscosity $[\eta]$ of the copolymer of this invention is 0.8 to 4.0 dl/g, preferably 1.0 to 3.0 dl/g, and for use as films, its suitable intrinsic viscosity $[\eta]$ is 1.0 to 3.0 dl/g.

Preferably, the ethylene copolymers of this invention consisting essentially of ethylene and α-olefins with 5 to 18 carbon atoms should have the following characteristics (v) to (vii) in addition to the characteristics (i) to (iv).

(v) They have an average spherulite size, determined by the small angle laser scattering method, of not more than $6\mu$, preferably not more than $4\mu$.

(vi) They have two or more melting points determined by differential thermal analysis (DSC).

(vii) They have a standard deviation (δ) of the distribution of ethylene content of not more than 3%, preferably 1 to 2.5%.

The characteristics (v) means that the ethylene copolymers of this invention have much smaller average spherulite sizes than the conventional ethylene copolymers having the same composition of constituent units.

The average spherulite size (R) is determined by the small angle laser scattering method using a 70μ-thick press sheet which is obtained by heating the copolymer to 220° C. and pressing it with water cooling at a pressure of 100 kg/cm²·G. Specifically, using a small angle laser scattering device, an Hv scattering pattern is obtained when the polarizer in the incident beam is vertical and the analyser in the scattered beam is horizontal. Then, the scattering angle $\theta_m$ which gives the maximum value in the distribution of the scattering intensity in the scattering pattern is determined, and the spherulite size (R) is obtained from the following equation.

$$\frac{4\pi}{\lambda} R \sin\left(\frac{\theta_m}{2}\right) = 4.0$$

(R. S. Stein's equation; see J. Appl. Phys., Vol. 31, No. 11, 1873 (1960))

Figure 2:
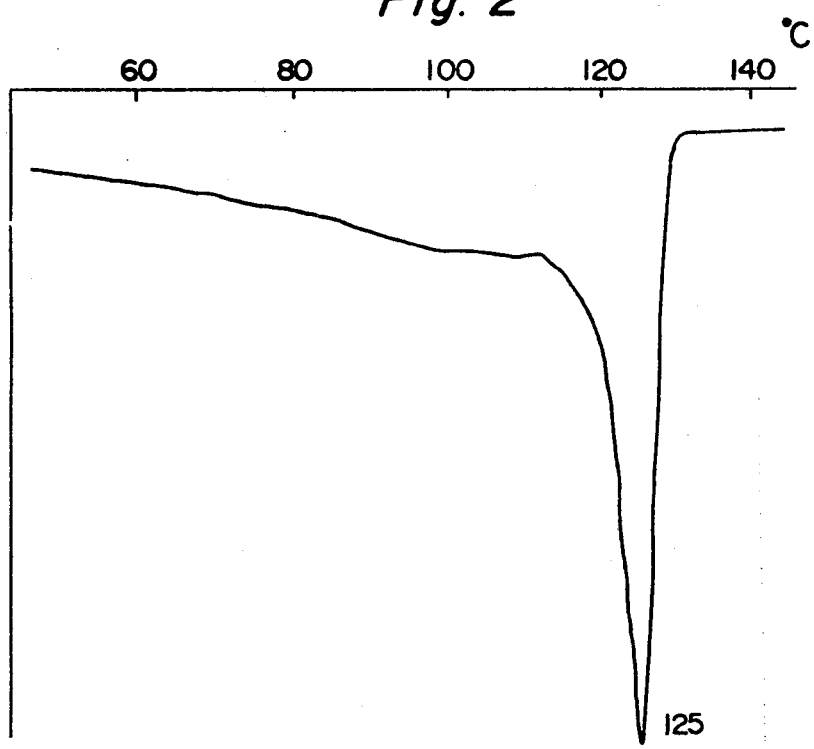

The structural characteristic (vi) means that the ethylene copolymers of this invention include two or more crystal types. For example, as shown in FIG. 1, a copolymer of ethylene with 4-methyl-1-pentene of this invention which has a $g_\eta^*$ of 0.13, an $[\eta]$ of 1.42 dl/g, a density of 0.926 g/cm³ and a maximum melting point in DSC of 122° C. has melting points at 108° C., 119° C. and 122° C. in its DSC endothermic curve. This shows that in this example, three crystal types exist. For comparison, FIG. 2 shows the DSC endothermic curve of a comparative copolymer of ethylene with 4-methyl-1-pentene having a $g_\eta^*$ of 0.83, an $[\eta]$ of 1.53 dl/g, a density of 0.927 g/cm³ and a melting point of 125° C. In this example, only one melting point is found at 125° C., and this shows that only one crystal type exists.

The characteristic (vii) shows that the ethylene copolymers of this invention have a very narrow distribution of the content of ethylene. The standard deviation (δ) is calculated from the following equation.

$$\sigma = \sqrt{\sum_i (x_i - \bar{x})^2 \omega_i}$$

wherein $x_i$ is the content of ethylene, $\bar{x}$ is the average of $x_i$ values, and $$\bar{x} = \sum_i x_i \omega_i$$

and $\omega_i$ is the proportion by weight.

For example, the copolymer shown in FIG. 1 has a standard deviation (δ) of 1.35 mole%, and the copolymer shown in FIG. 2 shows a standard deviation (δ) of 3.72 mole%.

Fractionation of the copolymer of this invention according to chemical composition is performed by fractionating it into five fractions by the Soxhlet extraction method, and the number of short-chain branchings derived from the α-olefin is determined by infrared absorption spectroscopy. The five fractions are as follows:

(1) A fraction soluble in p-xylene at room temperature
(2) A fraction extracted with boiling n-hexane
(3) A fraction extracted with boiling benzene
(4) A fraction extracted with boiling n-heptane
(5) A fraction extracted with boiling p-xylene Examples of the α-olefin comonomer which constitutes the copolymer of this invention are 1-pentene, 1-hexene, 1-octene, 1-decene, 1-dodecene, 1-tetradecene, 1-octadecene, 3-methyl-1-butene, 3-methyl-1-pentene, 4-methyl-1-pentene, 3-methyl-1-hexene, 4-methyl-1-hexene, 5-methyl-1-hexene, 3-methyl-1-heptene, 5-methyl-1-heptene, and mixtures of these. Preferred α-olefins are those containing 6 to 12 carbon atoms, above all 1-hexane, 1-octene, 1-decene, 3-methyl-1-pentene, 4-methyl-1-pentene, 5-methyl-1-hexane and 5-methyl-1-heptane. 4-Methyl-1-pentene is especially preferred.

The proportion of the comonomer to be copolymerized can be varied as desired according to the type of the comonomer. To afford a copolymer having the density specified by (i) above, the suitable proportion of the comonomer is usually about 1 to about 30% by weight, preferably about 3 to about 20% by weight, based on the weight of the copolymer. When an α-olefin having not more than 4 carbon atoms is selected as the comonomer, a copolymer having superior mechanical strength and/or transparency specified in the present invention cannot be obtained.

In the production of the ethylene copolymer of this invention, the selection of the catalyst and the polymerization conditions are important.

Preferably, the catalyst to be used is a catalyst composed of a solid titanium catalyst component and an organoaluminum compound. The use of a catalyst composed of a solid, magnesium-containing titanium catalyst component and an organoaluminum compound is more preferred. Especially preferred catalysts are those in which the solid titanium catalyst component is the one which is obtained by supporting titanium on a compound containing a magnesium halide, especially magnesium chloride, and which has a Cl/Ti weight ratio of 5 to 150, an Mg/Ti mole ratio of 3 to 90, and a surface area of at least 70 m²/g, preferably more than 150 m²/g. Of these catalysts composed of such preferred solid titanium catalyst components and organoaluminum compounds, especially suitable ones are the catalysts disclosed in British Pat. No. 1,433,537 published on Aug. 25, 1976 (corresponding to German OLS No. 2,346,471 laid open on Apr. 18, 1974) and German OLS No. 2,461,677 laid open on July 10, 1975. These patents do not give a specific example of copolymerizing ethylene with an α-olefin having 5 to 18 carbon atoms.

A solid titanium catalyst component which is disclosed in the cited British Pat. No. 1,433,537 and has the surface area specified hereinabove can be synthesized, for example, by adding about 3 to about 7 moles of a lower alcohol such as ethanol to 1 mole of magnesium chloride, reacting the adduct with an organoaluminum compound in an amount sufficient to react with the alcohol, and then reacting the resulting product with titanium tetrachloride or its solution in an inert hydrocarbon.

The solid titanium catalyst component disclosed in the German OLS No. 2,461,677 can be prepared by reacting the solid titanium catalyst component obtained by the method of the British Pat. No. 1,433,537 further with small amounts of titanium tetrachloride and an organoaluminum compound.

The solid titanium catalyst components obtained by these two methods contain titanium, magnesium, halogen and aluminum, and a surface area of at least 70 m$^2$/g, preferably more than 150 m$^2$/g but not exceeding 500 m$^2$/g.

In addition to the selection of the titanium catalyst component, the selection of the organoaluminum compound as another catalyst component is of importance in obtaining the copolymers of this invention. Preferred organoaluminum compounds are organoaluminum halides of the empirical formula $R_nAlX_{3-n}$ wherein R represents a hydrocarbon group such as an alkyl group with 1 to 12 carbon atoms, X represents a halide such as chloride, bromide, iodide, and $1 \leq n \leq 2.5$, preferably $1.5 \leq n \leq 2.0$, especially preferably $1.5 \leq n \leq 1.8$. A mixture of two or more such organoaluminum halides can also be used if it has an average composition within the above formula. Preferred species are alkylaluminum sesquichlorides and dialkylaluminum chloride. The alkylaluminum sesquichloride and mixtures thereof with dialkylaluminum chloride are especially preferred.

When a trialkylaluminum, dialkylaluminum hydride, dialkylaluminum alkoxide or alkylaluminum alkoxyhydride, all of which are frequently used in the polymerization of ethylene, is used as the organoaluminum compound, the copolymers obtained usually have a g$\eta$ * of at least 0.80, a standard deviation ($\sigma$) of at least 3.0 mole%, an average spherulite size (R) of not more than 7$\mu$, and one or two melting points.

In the production of the ethylene copolymers of this invention, the selection of the copolymerization conditions is important besides the selection of the catalyst.

Copolymerization should be carried out at a temperature above the melting point of the copolymer preferably in the co-presence of a hydrocarbon solvent, or using the monomer itself as a solvent, and under such conditions that the solvent and the resulting copolymer form a homogeneous phase. Preferably, the polymerization is carried out continuously while maintaining the concentrations of the monomers (ethylene and the comonomer) constant. The conditions which will give a homogeneous phase of the solvent and the copolymer vary according, for example, to the type of the solvent, the concentrations (or pressures) of the monomers (ethylene and the comonomer) or hydrogen, the polymerization temperature and the molecular weight (intrinsic viscosity) of the copolymer. It is advisable therefore to set such conditions by preliminary experiments.

Figure 3:
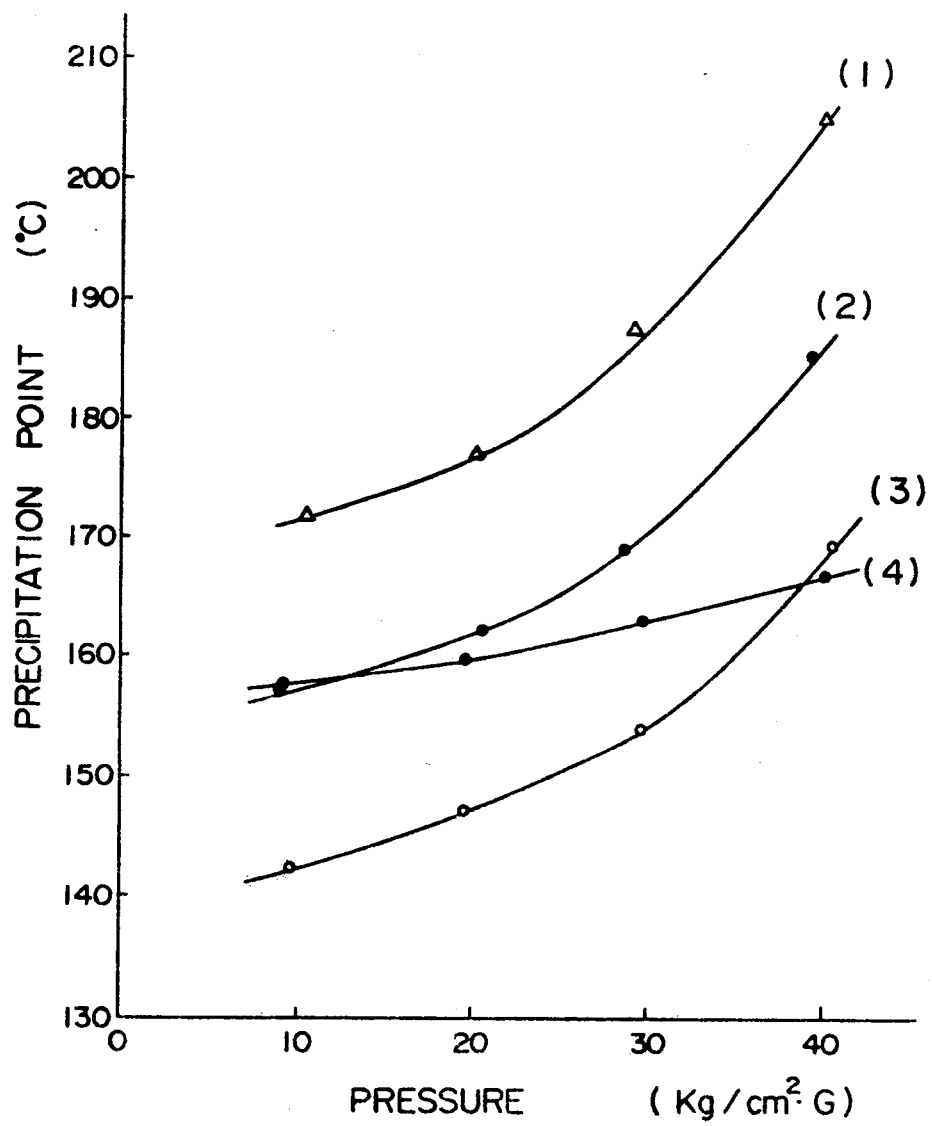

As an example, FIG. 3 shows the precipitation point in hexane of an ethylene/4-methyl-1-pentene copolymer having an intrinsic viscosity [$\eta$] of 1.42 dl/g, a density of 0.926 g/cm$^3$, a 4-methyl-1-pentene content of 2.9 mole% and melting points of 108° C., 119° C. and 122° C. The axis of abscissas represents the total pressure (the total pressure of hexane and ethylene, and optionally 4-methyl-1-pentene, in the case of a gaseous phase), and the axis of ordinates represents the temperature (precipitation temperature) at which the polymerization system becomes a heterogeneous phase. Curve (1) shows precipitation points in a mixture of hexane and 4-methyl-1-pentene (in a ratio of 85:15) with a copolymer concentration of 150 g/l; curve (2), precipitation points in the same mixture with a copolymer concentration of 100 g/l; and curve (3), precipitation points in the same mixture with a copolymer concentration of 50 g/l. Curve (4) shows precipitation points in hexane with a copolymer concentration of 50 g/l. At temperatures higher than the precipitation points, a heterogeneous phase results.

It can be seen from FIG. 3 that when the copolymer concentration is 50 to 150 g/l, the temperature range within which polymerization can be carried out in a homogeneous phase is broader with higher concentration of the copolymer and higher pressures. It is also clear from it that the operable temperature range differs according to the amounts of the monomers (ethylene and the comonomer).

FIG. 3 represents one model, and in an actual polymerization system, the temperature range for attaining a homogeneous phase is set experimentally prior to actual operation.

Low concentrations of the copolymer are not economical, and the operable temperature range is narrow at low concentrations. If the concentration of the copolymer is too high, the viscosity of the solution rises extremely high to inhibit the smooth proceeding of the polymerization reaction. Hence, it is usually preferred to maintain the concentration of the copolymer at about 50 to about 200 g per liter of the solvent.

Examples of the hydrocarbon solvent are aliphatic hydrocarbons such as n-hexane, n-heptane, iso-hexane, n-pentane, octane, decane and kerosene; alicyclic hydrocarbons such as cyclohexane or methylcyclohexane, and aromatic hydrocarbons such as benzene, toluene or xylene.

The suitable amount of the solid titanium catalyst component is 0.0005 to 1.0 millimole, preferably 0.001 to 0.1 millimole, calculated as titanium atom, per liter of the solvent, and the suitable amount of the organoaluminum compound is 0.01 to 10 millimoles, preferably 0.05 to 1.0 millimole, calculated as aluminum, per liter of the solvent. It is preferred that at this time, the Al/Ti mole ratio be adjusted to at least 1.

The proportion of the $\alpha$-olefin with 5 to 18 carbon atoms to be fed to the polymerization system, which varies according, for example, to the type of the $\alpha$-olefin, the polymerization temperature and the partial pressure of ethylene in the polymerization vessel, is 0.05 to 20 moles, preferably 0.10 to 5 moles, per mole of ethylene. Preferably, the polymerization is carried out under elevated pressures of, say, 2 to 100 kg/cm$^2$, preferably 15 to 70 kg/cm$^2$. The molecular weight of the copolymer is adjusted preferably by using hydrogen.

The copolymers of this invention have better transparency, tear resistance and impact resistance than high-pressure polyethylene, and are suitable for use as films. These superior properties along with their very good heat-sealability indicate their suitability as packaging films. Films of these copolymers, whether obtained by a T-die method or an inflation method, have a high level of transparency. The copolymers of this invention can also be formed into various shaped articles by, for example, blow molding, injection molding, or extrusion molding. Multilayer films can also be prepared by extrusion coating on other films. They can also be used as blends with other thermoplastic resins, for example olefin polymers such as polyethylene, polypropylene, poly-1-butene poly-4-methyl-1-pentene, an ethylene/propylene copolymer, an ethylene/butene copolymer or a propylene/1-butene copolymer. They can also be incorporated with petroleum resins, waxes, stabilizers, antistatic agents, ultraviolet absorbers, synthetic or natural rubbers, lubricants, inorganic fillers, etc.

The following examples illustrate the present invention in more detail.

EXAMPLE 1

Preparation of Catalyst

In a stream of nitrogen, 10 moles of commercially available anhydrous magnesium chloride was suspended in 50 liters of dehydrated and purified hexane, and with stirring 60 moles of ethanol was added dropwise over the course of 1 hour. The reaction was carried out for 1 hour at room temperature. To the reaction product was added dropwise 27 moles of diethylaluminum chloride, and the mixture was stirred for 1 hour at room temperature. Subsequently, 100 moles of titanium tetrachloride was added. The mixture was heated to 70° C., and reacted for 3 hours with stirring. The resulting solid was separated by decantation, and repeatedly washed with purified hexane to form a suspension of it in hexane. The concentration of titanium was determined by titration.

Polymerisation

A 200 liter continuous polymerization reactor was charged continuously with 80 liters/hr of dehydrated and purified hexane, 32 millimoles/hr of ethylaluminum sesquichloride, and 1.2 millimoles/hr, calculated as titanium, of the carrier-supported catalyst component prepared as above. Into the polymerization reactor, 13 kg/hr of ethylene, 13.0 kg/hr of 4-methyl-1-pentene, and 100 liters/hr of hydrogen were fed simultaneously. At a temperature of 145° C. and a total pressure of 30 kg/cm$^2$−G, these monomers were copolymerized while maintaining the residence time at 1 hour, and the concentration of the copolymer at 112 g per liter of hexane. The resulting copolymer had a density of 0.922 g/cm$^3$, a melt index of 2.24 and a molecular weight $<M\eta_w$ of 2,560,000, and contained 13.2 isobutyl groups per 1000 carbon atoms. A rapidly cooled press-formed sheet of the copolymer having a $g_{72}{}^*$ of 0.09 and a thickness of 70μ had an average spherulite size (R) of 1.5μ.

A film having a width of 350 mm and a thickness of 30μ was prepared from the copolymer by a tubular film-forming machine for high-pressure polyethylene (made by Modern Machinery). The molding conditions were as follows: the resin temperature 180° C.; the speed of screw rotation 100 revolutions per minute; the die diameter 100 mm; and the width of the die slit 0.7 mm.

The results are shown in Table 1.

Commercially available high-pressure polyethylenes shown in Table 4 were molded in the same way as above, and the results are shown in Table 4. (Comparative Examples 7 to 11).

EXAMPLE 2 AND COMPARATIVE EXAMPLES 1 to 3

Various ethylene/4-methyl-1-pentene copolymers were prepared under the conditions described in Table 1 using the titanium catalyst component prepared in Example 1. The properties of these copolymers are shown in Table 1.

The aluminum catalyst component used in Comparative Example 2 was obtained by reacting 0.5 mole of ethyl alcohol with 1 mole of triethyl aluminum.

Table 1

| Example (Ex.) or Comparative Example (CEx.) | Ex. 1 | Ex. 2 | CEx. 1 | CEx. 2 | CEx. 3 |
|---|---|---|---|---|---|
| Polymerization conditions | | | | | |
| Ethylene (kg/hr) | 13 | 13.5 | 14.0 | 13.5 | 13.5 |
| 4-Methyl-1-pentene (kg/hr) | 13.0 | 14.4 | 18.0 | 16.0 | 16.5 |
| Hydrogen (l/hr) | 100 | 70 | 40 | 50 | 50 |
| Hexane (l/hr) | 80 | 80 | 80 | 80 | 80 |
| Titanium catalyst component (millimoles/hr, calculated as Ti) | 1.2 | 0.70 | 0.28 | 0.32 | 0.4 |
| Aluminum catalyst component (millimoles/hr) | Ethyl aluminum sesquichloride (32) | Ethyl aluminum sesquichloride (16) Diethyl aluminum chloride (8) | Triethyl aluminum (20) | Ethyl aluminum ethoxide (20) | Diethyl aluminum hydride (24) |
| Temperature (°C.) | 145 | 145 | 145 | 145 | 145 |
| Pressure (Kg/cm$^2$-G) | 30 | 30 | 30 | 30 | 30 |
| Residence time (hr) | 1 | 1 | 1 | 1 | 1 |
| Concentration of polymer (g/l-hexane) | 112 | 119 | 128 | 115 | 115 |
| Properties of the copolymer | | | | | |
| Ethylene content (mole %) | 97.2 | 96.5 | 96.1 | 97.1 | 96.9 |
| Density (g/cm$^3$) | 0.922 | 0.923 | 0.920 | 0.926 | 0.925 |
| Number of isobutyl groups (per 1000 carbon atoms) | 13.2 | 17.0 | 20.1 | 13.8 | 14.5 |
| Melt index | 2.24 | 4.05 | 4.65 | 5.22 | 4.30 |
| Melting point (°C.) | 114,119 | 116,122 | 121,124 | 124.5 | 125 |
| Molecular weight, $<M>_w \times 10^{-4}$ | 256 | 36.3 | 9.8 | 7.7 | 8.4 |
| Intrinsic viscosity (η) (dl/g) | 1.71 | 1.55 | 1.56 | 1.49 | 1.56 |
| $g_\eta{}^*$ | 0.09 | 0.35 | 0.83 | 0.93 | 0.92 |

Table 1-continued

| Example (Ex.) or Comparative Example (CEx.) | Ex. 1 | Ex. 2 | CEx. 1 | CEx. 2 | CEx. 3 |
|---|---|---|---|---|---|
| Standard deviation ($\sigma$) (mole %) | 1.26 | 2.12 | 3.86 | 4.10 | 4.03 |
| Average spherulite size R ($\mu$) of a 70$\mu$-thick rapidly cooled press-formed sheet | 1.5 | 1.7 | 6.1 | 6.6 | 6.2 |
| Haze of 30$\mu$-thick inflation film (%) | 0.9 | 2.0 | 14 | 23 | 18 |
| Impact strength (kg . cm/cm) | 2900 | 2600 | 2000 | 1900 | 2100 |
| Elmendorf tear strength (kg/cm) | | | | | |
| Machine direction | 142 | 101 | 63 | 14 | 24 |
| Transverse direction | 181 | 161 | 118 | 70 | 88 |

EXAMPLE 3

Preparation of Catalyst

In a stream of nitrogen, 10 moles of commercially available magnesium chloride was suspended in 50 liters of dehydrated and purified hexane, and with stirring, 60 moles of ethanol was added dropwise over the course of 1 hour. The reaction was then performed for 1 hour at room temperature. To the reaction product was added dropwise 28 moles of diethylaluminum chloride at room temperature, and the mixture was stirred for 1 hour. Subsequently, 7 moles of titanium tetrachloride and 7 moles of triethyl aluminum were added, and the reducing reaction was performed at room temperature for 4 hours with stirring. The solid portion turned light brown which is a color peculiar to trivalent titanium. The titanium concentration of the resulting hexane suspension was determined by titration.

Polymerization

The same continuous polymerization apparatus as used in Example 1 was charged continuously with 80 l/hr of hexane, 32 millimoles/hr of ethylaluminum sesquichloride and 1.2 millimoles/hr, calculated as titanium, of the supported catalyst component. Into the polymerization vessel, 12.5 kg/hr of ethylene, 11.0 kg/hr of 4-methyl-1-pentene and 110 l/hr of hydrogen were continuously fed simultaneously. At a temperature of 145° C. and a total pressure of 30 kg/cm$^2$-G, the monomers were copolymerized while maintaining the residence time at 1 hour, and the concentration of the copolymer at 110 g per liter of the hexane. The properties of the resulting copolymer, and the properties of its molded products prepared in the same way as in Example 1 are shown in Table 2.

EXAMPLE 4 AND COMPARATIVE EXAMPLES 4 and 5

Various ethylene/4-methyl-1-pentene copolymers were prepared under the conditions shown in Table 2 using the titanium catalyst component prepared in Example 3. The results are also shown in Table 2.

Table 2

| Example (Ex.) or Comparative Example (CEx.) | Ex. 3 | Ex. 4 | CEx. 4 | CEx. 5 |
|---|---|---|---|---|
| Polymerization conditions | | | | |
| Ethylene (kg/hr) | 12.5 | 13.5 | 13.5 | 13.0 |
| 4-Methyl-1-pentene (kg/hr) | 11.0 | 16.0 | 15.0 | 16.0 |
| Hydrogen (l/hr) | 110 | 50 | 50 | 60 |
| Hexane (l/hr) | 80 | 80 | 80 | 80 |
| Titanium catalyst component (millimoles/hr, calculated as Ti) | 1.2 | 0.4 | 0.32 | 0.4 |
| Aluminum catalyst component (millimoles/hr) | Ethyl aluminum sesquichloride (32) | Diethyl aluminum chloride (20) | Triisobutyl aluminum (24) | Diisobutyl aluminum hydride (24) |
| Temperature (°C.) | 145 | 145 | 145 | 145 |
| Pressure (Kg/cm$^2$-G) | 30 | 30 | 30 | 30 |
| Residence time (hr) | 1 | 1 | 1 | 1 |
| Concentration of polymer (g/l-hexane) | 110 | 118 | 105 | 108 |
| Properties of the copolymer | | | | |
| Ethylene content (mole %) | 97.1 | 96.8 | 96.6 | 96.7 |
| Density (g/cm$^3$) | 0.926 | 0.924 | 0.924 | 0.924 |
| Number of isobutyl groups (per 1000 carbon atoms) | 13.9 | 15.2 | 16.1 | 15.8 |
| Melt index | 4.58 | 4.68 | 4.43 | 4.32 |
| Melting point (°C.) | 108,119,122 | 120,123 | 124.5 | 124 |
| Molecular weight, $<M>_w \times 10^{-4}$ | 137 | 41.5 | 9.2 | 8.5 |
| Intrinsic viscosity ($\eta$) (dl/g) | 1.42 | 1.45 | 1.53 | 1.52 |
| $g_\eta$ | 0.13 | 0.30 | 0.85 | 0.89 |
| Standard deviation ($\sigma$) (mole %) | 1.35 | 2.14 | 3.91 | 3.35 |
| Average spherulite size R($\mu$) of a 70$\mu$-thick rapidly cooled press-formed sheet | 1.2 | 1.8 | 7.3 | 6.3 |
| Haze of 30$\mu$-thick inflation film (%) | 0.8 | 2.5 | 28 | 19 |
| Impact strength (kg . cm/cm) | 2800 | 2500 | 2100 | 2200 |
| Elmendorf tear strength (kg/cm) | | | | |
| Machine direction | 128 | 102 | 32 | 45 |

Table 2-continued

| Example (Ex.) or Comparative Example (CEx.) | Ex. 3 | Ex. 4 | CEx. 4 | CEx. 5 |
|---|---|---|---|---|
| Transverse direction | 194 | 171 | 101 | 81 |

EXAMPLE 5

Ethylene and an α-olefin mixture (Dialene 610, a trademark for a product of Mitsubishi Chemical Co., Ltd.; mixture of 35.9% of 1-hexene, 33.3% of 1-octene and 30.8% of 1-decene) were simultaneously fed continuously into a polymerization vessel, and copolymerized under the conditions shown in Table 3 using the titanium catalyst component described in Example 3. The properties of the resulting copolymer and its molded articles prepared in the same way as in Example 1 are shown in Table 3.

EXAMPLE 6 and Comparative Example 6

In the same way as in Example 5, ethylene and an α-olefin mixture (Dialene 124, a trademark for a product of Mitsubishi Chemical Co., Ltd.; mixture consisting of 56.6% of 1-dodecene and 43.4% of 1-tetradecene) or 1-butene were continuously polymerized. The properties of the copolymers obtained are shown in Table 3.

Table 3

| Example (Ex.) or Comparative Example (CEx.) | Ex. 5 | Ex. 6 | CEx. 6 |
|---|---|---|---|
| Polymerization conditions | | | |
| Ethylene (kg/hr) | 14.0 | 13.5 | 13.0 |
| α-Olefin (kg/hr) | Olefin mixture (15.0) | Olefin mixture (15.0) | 1-Butene (8.0) |
| Hydrogen (l/hr) | 60 | 60 | 60 |
| Hexane (l/hr) | 80 | 80 | 80 |
| Titanium catalyst component (milimoles/hr, calculated as Ti) | 0.5 | 0.8 | 0.4 |
| Aluminum catalyst component (millimoles/hr) | Diethylaluminum chloride (25) | Diethylaluminum chloride (40) | Triethylaluminum (28) |
| Temperature (°C.) | 145 | 145 | 145 |
| Pressure (Kg/cm²-G) | 30 | 30 | 30 |
| Residence time (hr) | 1 | 1 | 1 |
| Concentration of polymer (g/l-hexane) | 125 | 117 | 115 |
| Properties of the copolymer | | | |
| Ethylene content (mole %) | 97.8 | 98.6 | 95.2 |
| Density (g/cm³) | 0.922 | 0.925 | 0.919 |
| Melt index | 3.15 | 3.91 | 2.09 |
| Melting point (°C.) | 107,122.5 | 110,123.5 | 123 |
| Molecular weight, $<M>_w \times 10^{-4}$ | 13.6 | 14.7 | 11.6 |
| Intrinsic viscosity (η) (dl/g) | 1.70 | 1.60 | 1.75 |
| gη | 0.70 | 0.63 | 0.81 |
| Standard deviation (σ) (mole %) | 2.23 | 2.36 | — |
| Average spherulite size R(μ) of a 70μ-thick rapidly cooled press-formed sheet | 1.6 | 1.7 | 4.2 |
| Haze of 30μ-thick inflation film (%) | 1.0 | 2.0 | 12 |
| Impact strength (kg . cm/cm) | 2500 | 2400 | 830 |
| Elmendorf tear strength (kg/cm) | | | |
| Machine direction | 110 | 105 | 73 |
| Transverse direction | 183 | 165 | 60 |

Table 4

| Comparative Examples | 7 | 8 | 9 | 10 | 11 |
|---|---|---|---|---|---|
| Properties of the polymer | | | | | |
| Density (g/cm³) | 0.923 | 0.922 | 0.924 | 0.924 | 0.921 |
| Number of methyl groups (per 1000 carbon atoms) | 16.0 | 17.7 | 14.4 | 18.2 | 14.9 |
| Melt index | 1.0 | 2.0 | 2.8 | 2.5 | 3.2 |
| Melt Point (°C.) | 112 | 110 | 113 | 111 | 108 |
| Molecular weight, $<M>_w \times 10^{-4}$ | 20.0 | 14.3 | 16.7 | 19.2 | 20.4 |
| Intrinsic viscosity (η) (dl/g) | 1.07 | 1.01 | 0.99 | 1.10 | 1.08 |
| gη | 0.34 | 0.40 | 0.35 | 0.36 | 0.33 |
| Haze of 30μ-thick inflation film (%) | 8.1 | 4.9 | 4.7 | 4.3 | 6.0 |
| Impact strength (kg . cm/cm) | 1700 | 1400 | 1500 | 1300 | 1600 |
| Elmendorf tear strength(kg/cm) | | | | | |
| Machine direction | 157 | 115 | 157 | 103 | 84 |
| Transverse direction | 78 | 107 | 73 | 87 | 96 |

What we claim is:

1. A copolymer consisting essentially of ethylene and an α-olefin with 5 to 18 carbon atoms, said copolymer having
   (i) a density of 0.90 to 0.94 g/cm³, (ii) an intrinsic viscosity $[\eta]$ of 0.8 to 4.0 dl/g, (iii) a maximum melting point, determined by differential thermal analysis, of 115° to 130° C., and (iv) a $g_\eta^*(=[\eta]/[\eta]_l)$ value of 0.05 to 0.78, in which formula $[\eta]$ is the intrinsic viscosity of the copolymer and $[\eta]_l$ is the intrinsic viscosity of a linear polyethylene having the same weight average molecular weight determined by the light scattering method as said copolymer.

2. The copolymer of claim 1 which has (v) an average spherulite size, determined by the small angle laser scattering method, of not more than 6μ.

3. The copolymer of claim 1 which has (vi) two or more melting points determined by differential thermal analysis.

4. The copolymer of claim 1 which has (vii) a standard deviation ($\sigma$) of the distribution of ethylene content of not more than 3 mole%.

5. The copolymer of claim 1 wherein the $g_\eta^*$ value is 0.05 to 0.5.

6. The copolymer of claim 1 wherein the α-olefin has 6 to 12 carbon atoms.

7. The copolymer of claim 1 wherein the α-olefin is at least one member selected from the group consisting of 1-hexene, 1-octene, 1-decene, 1-dodecene, 1-tetradecene, 1-octadecene, 3-methyl-1-butene, 3-methyl-1-pentene, 3-methyl-1-hexene, 4-methyl-1-hexene, 5-methyl-1-hexene, 3-methyl-1-heptene and 5-methyl-1-heptene.

8. The copolymer of claim 1 wherein the density is 0.91 to 0.935 g/cm$^3$.

9. The copolymer of claim 1 wherein the intrinsic viscosity is 1.0 to 3.0 dl/g.

10. A composition comprising a blend of the copolymer of claim 1 with polyethylene.

11. The copolymer of claim 1 wherein the comonomer is 4-methyl-1-pentene or a mixture of 4-methyl-1-pentene and at least one member selected from the group consisting of 1-hexene, 1-octene, 1-decene, 1-dodecene, 1-tetradecene, 1-octadecene, 3-methyl-1-butene, 3-methyl-1-pentene, 3-methyl-1-hexene, 4-methyl-1-hexene, 5-methyl-1-hexene, 3-methyl-1-heptene and 5-methyl-1-heptene.

12. The copolymer of claim 1 wherein the comonomer is 4-methyl-pentene-1.

* * * * *